United States Patent
Sartori et al.

(10) Patent No.: US 10,244,538 B2
(45) Date of Patent: Mar. 26, 2019

(54) SYSTEM AND METHOD FOR DETERMINING A RESOURCE SELECTION TECHNIQUE

(71) Applicant: Futurewei Technologies, Inc., Plano, TX (US)

(72) Inventors: Philippe Sartori, Plainfield, IL (US); George Calcev, Hoffman Estates, IL (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/428,003

(22) Filed: Feb. 8, 2017

(65) Prior Publication Data

US 2017/0238321 A1  Aug. 17, 2017

Related U.S. Application Data

(60) Provisional application No. 62/294,541, filed on Feb. 12, 2016.

(51) Int. Cl.
| | | |
|---|---|---|
| *H04W 72/00* | (2009.01) | |
| *H04W 72/04* | (2009.01) | |
| *H04L 12/801* | (2013.01) | |
| *H04W 4/04* | (2009.01) | |
| *H04W 74/08* | (2009.01) | |

(52) U.S. Cl.
CPC ......... *H04W 72/0486* (2013.01); *H04L 47/29* (2013.01); *H04W 4/046* (2013.01); *H04W 74/0808* (2013.01); *H04W 74/0833* (2013.01)

(58) Field of Classification Search
CPC .................................................. H04L 47/29
See application file for complete search history.

(56) References Cited

U.S. PATENT DOCUMENTS

| | | | |
|---|---|---|---|
| 6,934,340 B1 * | 8/2005 | Dollard | H04L 27/2608 375/260 |
| 6,965,942 B1 * | 11/2005 | Young | H04W 74/085 370/447 |
| 7,280,519 B1 * | 10/2007 | Shane | H04W 16/00 370/338 |
| 9,980,193 B2 * | 5/2018 | Sorrentino | H04W 36/22 |

(Continued)

FOREIGN PATENT DOCUMENTS

| | | | | |
|---|---|---|---|---|
| CN | 101534235 A | 9/2009 | | |
| WO | WO 2014/090200 | * | 6/2014 | ............ H04W 72/04 |
| WO | 2015184962 A1 | 12/2015 | | |

OTHER PUBLICATIONS

LG Electronics, "Discussion on enhancement for PC5 based V2V resource allocation" 3GPP TSG RAN WG1 Meeting #83, R1-157435, Anaheim, USA, Nov. 15-22, 2015, 18 pages.

(Continued)

*Primary Examiner* — Stephen M D Agosta
(74) *Attorney, Agent, or Firm* — Slater Matsil, LLP

(57) ABSTRACT

A method for vehicle-to-everything (V2X) communication in a wireless network, the method includes determining, by a first User Equipment (UE), a V2X carrier load in a coverage area of a Base station (BS), and transmitting, by the first UE, a data message over an air interface using either a random resource selection technique or a resource sensing multiple access technique based on the V2X carrier load in the coverage area of the BS.

27 Claims, 6 Drawing Sheets

(56) References Cited

U.S. PATENT DOCUMENTS

| | | | | |
|---|---|---|---|---|
| 2006/0182032 A1* | 8/2006 | Yang | | H04L 1/1664 370/236 |
| 2006/0217125 A1* | 9/2006 | Miyazaki | | H04W 74/0808 455/453 |
| 2007/0160003 A1* | 7/2007 | Meier | | H04W 74/02 370/329 |
| 2008/0291889 A1* | 11/2008 | Matsumoto | | H04W 74/085 370/348 |
| 2010/0256852 A1* | 10/2010 | Mudalige | | G08G 1/163 701/24 |
| 2010/0312432 A1* | 12/2010 | Hamada | | G08G 1/163 701/31.4 |
| 2011/0183679 A1* | 7/2011 | Moon | | H04W 72/082 455/450 |
| 2012/0083279 A1* | 4/2012 | Likar | | H04W 36/0083 455/446 |
| 2012/0093091 A1 | 4/2012 | Kang et al. | | |
| 2012/0185605 A1* | 7/2012 | Patil | | H04W 76/14 709/228 |
| 2013/0329651 A1* | 12/2013 | Lee | | H04W 52/04 370/329 |
| 2013/0336120 A1* | 12/2013 | Bai | | H04W 28/0231 370/235 |
| 2014/0066113 A1* | 3/2014 | Zhuang | | H04B 7/026 455/501 |
| 2014/0148188 A1* | 5/2014 | Widell | | H04W 72/1252 455/452.2 |
| 2014/0153390 A1* | 6/2014 | Ishii | | H04W 28/0289 370/230 |
| 2014/0254355 A1* | 9/2014 | Soliman, Sr. | | H04W 28/08 370/229 |
| 2015/0009910 A1* | 1/2015 | Ryu | | H04W 72/04 370/329 |
| 2015/0282210 A1 | 10/2015 | Li et al. | | |
| 2015/0326373 A1* | 11/2015 | Ryu | | H04L 5/0053 370/330 |
| 2016/0174122 A1* | 6/2016 | Sorrentino | | H04B 1/3822 370/331 |

OTHER PUBLICATIONS

Huawei, Hisilicon, "UE autonomous resource selection", 3GPP TSG RAN WG1 Meeting #84, R1-160307, St Julian's, Malta, Feb. 15-19, 2016, 6 pages.

Intel Corporation, "Discussion on sensing aspects to support V2V communication with different transmission periodicity", 3GPP TSG RAN WG1 Meeting #85, R1-165073, Najing, China, May 23-27, 2016, 8 pages.

* cited by examiner

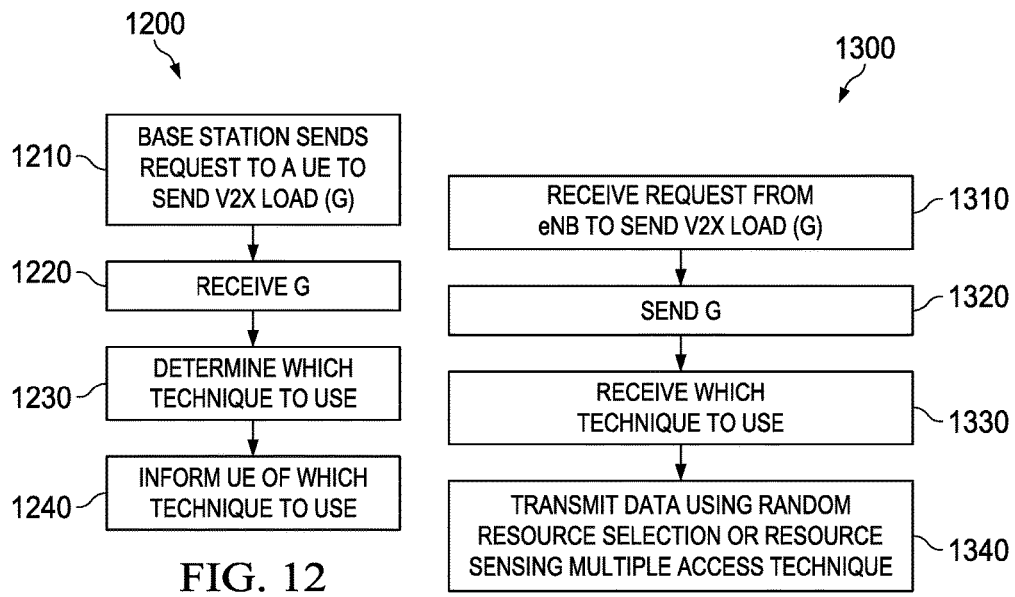
FIG. 12
FIG. 13
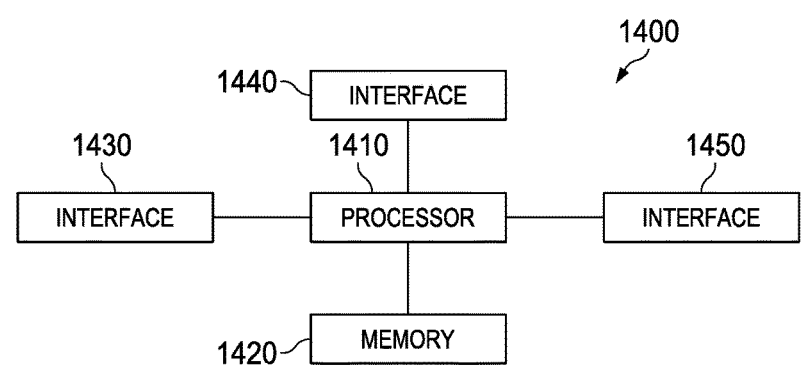
FIG. 14
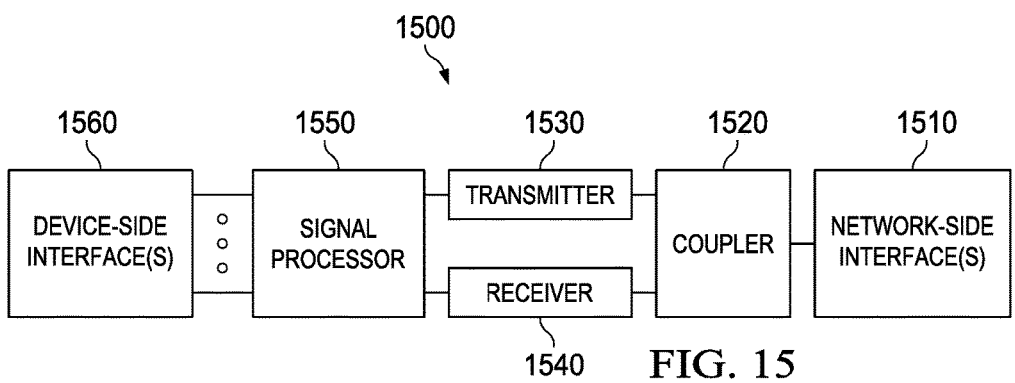
FIG. 15

SYSTEM AND METHOD FOR DETERMINING A RESOURCE SELECTION TECHNIQUE

CROSS-REFERENCE TO RELATED APPLICATIONS

This Application claims the benefit of U.S. Provisional Application No. 62/294,541, filed Feb. 12, 2016 entitled "System and Method for Determining a Random Access Method," which is hereby incorporated by reference herein as if reproduced in its entirety.

TECHNICAL FIELD

The present invention relates to a system and method for wireless communications, and, in particular embodiments, to a system and method for determining a resource selection technique.

BACKGROUND

3rd Generation Partnership Project (3GPP) is currently standardizing vehicle-to-everything (V2X) and vehicle-to-vehicle (V2V) communication for Long Term Evolution (LTE) and 5th Generation (5G) networks. To improve communication across these devices, it is generally desirable to select communication methods appropriate to the conditions of the network to reduce network congestion and latency, eliminate inconsistencies, and/or promote fairness in resource allocation.

SUMMARY

Technical advantages are generally achieved, by embodiments of this disclosure which describe systems and methods for determining a resource selection technique.

In accordance with an embodiment, a method for vehicle-to-everything (V2X) communication in a wireless network, the method includes determining, by a first User Equipment (UE), a V2X carrier load in a coverage area of a Base station (BS), and transmitting, by the first UE, a data message over an air interface using either a random resource selection technique or a resource sensing multiple access technique based on the V2X carrier load in the coverage area of the BS.

In accordance with yet another embodiment, a method for vehicle-to-everything (V2X) communication in a wireless network, the method includes determining, by a first User Equipment (UE), a length of a V2X data message, and transmitting, by the first UE, the V2X data message over an air interface using either a random resource selection technique or a resource sensing multiple access technique based on the length of the V2X data message.

In accordance with yet another embodiment, a method for vehicle-to-everything (V2X) communication in a wireless network, the method includes determining, by a Base Station (BS), a V2X carrier load in a coverage area of the BS, determining, by the BS, whether a random resource selection technique or a resource sensing multiple access technique should be used for transmissions in the coverage area of the BS based on the V2X carrier load of the coverage area, and transmitting, by the BS, a control message to at least one UE, the control message instructing the at least one UE to perform transmissions using either the random resource selection technique or the resource sensing multiple access technique.

BRIEF DESCRIPTION OF THE DRAWINGS

For a more complete understanding of the present invention, and the advantages thereof, reference is now made to the following descriptions taken in conjunction with the accompanying drawing, in which:

FIG. 12 is a flowchart of another embodiment method for instructing a UE to perform V2X transmissions using either a random resource selection or resource sensing multiple access technique;

FIG. 13 is a flowchart of an embodiment method for transmitting data over a V2X network using either a random resource selection or resource sensing multiple access technique;

FIG. 14 is a block diagram of an embodiment processing system for performing methods described herein; and FIG. 15 is a block diagram of a transceiver adapted to transmit and receive signaling over a telecommunications network.

DETAILED DESCRIPTION OF ILLUSTRATIVE EMBODIMENTS

Figure 1:
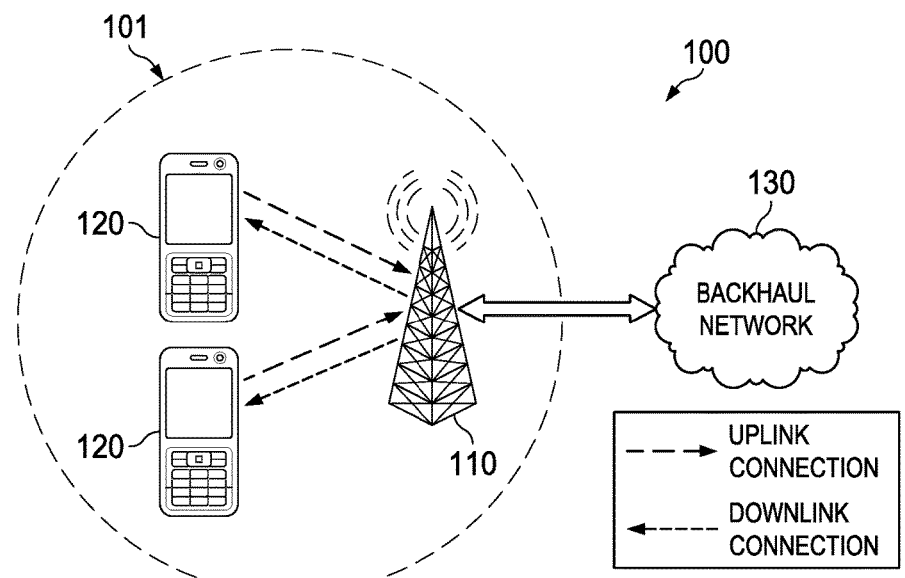
FIG. 1 is a diagram of a network for communicating data.

The structure, manufacture, and use of embodiments are discussed in detail below. It should be appreciated, however, that this disclosure provides many applicable inventive concepts that can be embodied in a wide variety of specific contexts. The specific embodiments discussed are merely illustrative of specific ways to make and use the invention, and do not limit the scope of the invention.

As used herein, the term "Vehicle-to-Everything (V2X) communication" refers to wireless communication between a vehicle and another device, including uplink and/or downlink transmissions between a vehicle and a Base Station (BS) as well as vehicle-to-vehicle (V2V) communications between two or more vehicles.

The present disclosure will be described with respect to example embodiments in Long Term Evolution (LTE)-based V2X communication networks. Embodiment V2X resource selection may be implemented in standards compliant communications systems, such as those compliant with the Institute of Electrical and Electronic Engineers (IEEE) 802.11 and/or other technical standards, as well as non-standards compliant communication systems. As used herein, the term "network" refers to any collection of two or more devices that communicate directly or indirectly with one another, including those in which a user-side device (e.g., a User Equipment) communicates directly with a network-side device (e.g., a base station), those in which user-side devices communicate indirectly with one another via network-side-devices, and those in which user-side devices communicate indirectly with one another without relaying the communications through network-side devices. Other examples are possible, such as when network-side devices communicate directly with one another.

Wireless vehicle communication provides numerous benefits, not limited to, improvements in safety in the form of forward collision warning and road work notification, energy efficiency in the form of enhanced route selection, and time saving and convenience in the form of real time route correction. One challenge in V2X communication is that handovers occur quite frequently, which makes it difficult to efficiently schedule resources for transmission from the vehicles to BSs or to other vehicles. One alternative is for the vehicles to perform grant-free uplink transmission using either resource sensing multiple access technique or a random resource selection technique.

Resource sensing multiple access techniques seek to avoid collisions between grant-free transmissions from different User Equipments (UE)s by requiring the UEs to sense a grant-free resource for a sensing period prior to transmitting a data message over the grant-free resource. If the UE senses a transmission from another UE during the sensing period, then the UE either defers transmission of the data message until the grant-free resource becomes free or switches to a different grant-free resource. Carrier sensing multiple access (CSMA) is a widely used resource sensing multiple access technique.

Random resource selection techniques avoid the latency associated with resource sensing multiple access technique by allowing the UEs to transmit a data message over a grant-free resource immediately without waiting for expiration of a sensing period. Resource sensing multiple access techniques and random resource selection techniques provide different levels of performance (e.g., throughput, reliability, etc.) in different scenarios. Accordingly, techniques for selecting between the two are needed for V2X communication. Embodiments of this disclosure select between resource sensing multiple access technique and random resource selection technique based on a V2X carrier load in a coverage area of a BS and/or a length of a V2X data message to be transmitted by the UE. The V2X carrier may be a standalone carrier on a V2X communication dedicated channel or on a channel shared with cellular communications.

In an embodiment, the V2X carrier load can be determined by a UE according to an energy level of one or more subcarriers associated with a BS. In another embodiment, the UE can monitor a control channel to determine a number of grant-free transmissions performed by neighboring UEs and determine the V2X carrier load according to the number of grant-free transmissions performed by the neighboring UEs. In these embodiments, the UE sends a data message using the random resource selection technique when the V2X carrier load is less than a lower load threshold or greater than an upper load threshold, and sends the data message using the resource sensing multiple access technique when the V2X carrier load is in-between the lower load threshold and the upper load threshold. In another embodiment, a BS determines the V2X carrier load, selects the appropriate access technique based on the V2X carrier load, and instructs the UEs to use the selected access technique via downlink control signaling (e.g., a broadcast message, etc.).

In another embodiment, a UE determines a length of a V2X data message and uses a random resource selection technique to transmit the V2X data message when the length of the V2X data message is less than a data length threshold, and uses a resource sensing multiple access technique to transmit the V2X data message when the length of the V2X data message exceeds the data length threshold. The upper and lower load thresholds, and/or data length threshold may be determined by the UE or a BS.

In one embodiment, the data length and/or upper and lower load thresholds are a priori information of the UE, or otherwise determined by the UE without a pre-configured protocol, such as load prediction. In one embodiment, the data length and/or upper and lower load threshold is transmitted by the BS to the UE.

FIG. 1 is diagram of a network 100 for communicating data. The network 100 includes a BS no having a coverage area 101, a plurality of UEs 120, and a backhaul network 130. As shown, the BS no establishes uplink (dashed line) and/or downlink (dotted line) connections with the UEs 120, which serve to carry data from the UEs 120 to the BS no and vice-versa. Data carried over the uplink/downlink connections may include data communicated between the UEs 120, as well as data communicated to/from a remote-end (not shown) by way of the backhaul network 130. As used herein, the term "base station (BS)" refers to any component (or collection of components) configured to provide wireless access to a network, such as an enhanced Node B (eNB), a transmit/receive point (TRP), a macro-cell, a femtocell, a Wi-Fi Access Point (AP), and other wirelessly enabled devices. BSs may provide wireless access in accordance with one or more wireless communication protocols, e.g., 5th generation new radio (5G_NR), LTE, LTE advanced (LTE-A), High Speed Message Access (HSPA), Wi-Fi 802.11a/b/g/n/ac, etc. As used herein, the term "UE" refers to any component (or collection of components) capable of establishing a wireless connection with a BS, such as a mobile device, a mobile station (STA), and other wirelessly enabled devices. In some embodiments, the network 100 may include various other wireless devices, such as relays, low power nodes, etc.

Figure 2:
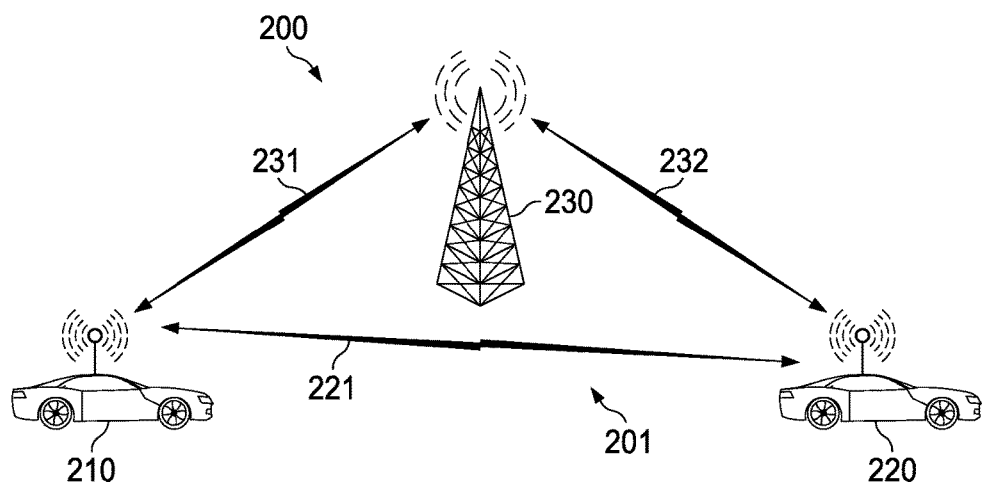
FIG. 2 is a diagram of a general V2X communication network.

FIG. 2 is a diagram of a V2X network 200. The V2X wireless network 200 includes a BS 230 and UEs 210, 220. The UE 210 transmits a data message over an air interface in a coverage area of a BS 230. The air interface may be a sidelink 221 between the UE 210 and the UE 220 or a wireless connection 231 between the UE 210 and the BS 230. The UE 210 may transmit the data message over the air interface using either a random resource selection technique or resource sensing multiple access technique.

In one embodiment, the UE 210 selects either the random resource selection technique or the resource sensing multiple access technique based on a V2X carrier load in the coverage area 201 of the BS 230. The UE 210 may determine the V2X carrier load by measuring an energy level on one or more subcarriers associated with the BS 230. Alternatively, the UE 210 may determine the V2X carrier load based on the number of grant-free transmissions performed by neighboring UEs, e.g., the UE 220 and/or other UEs in the coverage area 201 of the BS 230. For example, the UE 210 may monitor a control channel to determine a number of grant-free transmissions performed by neighboring UEs. The control channel may be established over one or more V2V interfaces between UEs in the coverage area 201 of the BS 230, such as over the V2V interface 221 between the UE 210 and the UE 220 as well as V2X interface between the UE 210 and other neighboring UEs. UEs may transmit a message over the control channel every time a grant-free transmission is performed, thereby allowing other UEs in the network to gauge, or otherwise estimate, the V2X carrier load based on the number of messages detected in the channel.

In yet another embodiment, the BS 230 transmits a control message to the UE 210 instructing the UE 210 to perform data transmissions using either the random resource selection technique or the resource sensing multiple access technique. The BS 230 may transmit the control message indirectly to the UE 210 via an intermediate device. The intermediate device may be another UE (e.g., the UE 220) or another BS. Alternatively, the BS 230 may transmit the control message directly to the UE 210 without the wireless connection 231.

Figure 3:
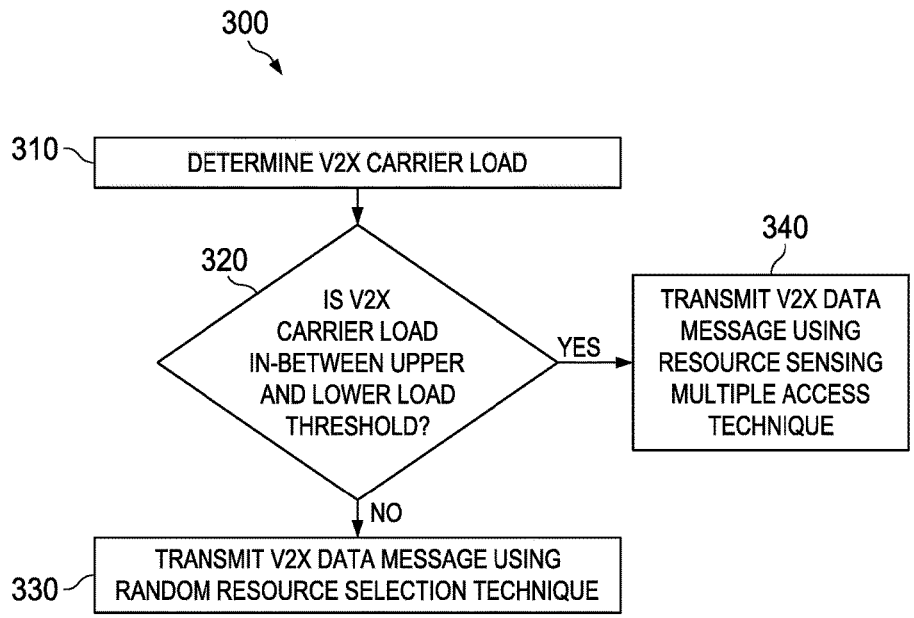
FIG. 3 is a flowchart of an embodiment method for transmitting data over a V2X network using either a random resource selection or resource sensing multiple access technique.

FIG. 3 is a flowchart of an embodiment method 300 for transmitting data over a V2X network using either a random resource selection or resource sensing multiple access technique in accordance with a V2X carrier load, as may be performed by a UE. At step 310, the UE determines the V2X carrier load in a coverage area of a BS. At step 320, the UE compares the V2X carrier load with an upper and lower load threshold. If the V2X carrier load is less than the lower load threshold or greater than the upper load threshold, then the UE transmits the V2X data message over an air interface using the random resource selection technique at step 330. Alternatively, if the V2X carrier load is in-between the upper and lower load thresholds, then the UE transmits the V2X data message over the air interface using the resource sensing multiple access technique at step 340.

Figure 4:
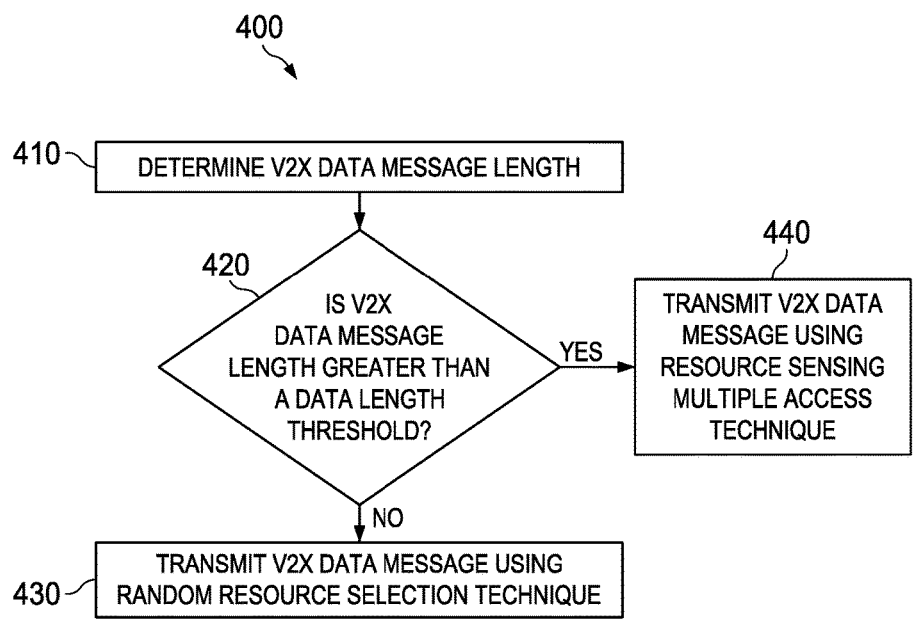
FIG. 4 is a flowchart of another embodiment method for transmitting data over a V2X network using either a random resource selection or resource sensing multiple access technique.

FIG. 4 is a flowchart of another embodiment method 400 for transmitting data over a V2X network using either a random resource selection or resource sensing multiple access technique in accordance with a V2X data message length, as may be performed by a UE. At step 410, the UE determines the length of the V2X data message. At step 420, the UE compares the length of the V2X data message with a data length threshold. If the length of the V2X data message is less than the data length threshold, then the UE transmits the V2X data message over an air interface using the random resource selection technique at step 430. On the other hand, if the length of the V2X data message is greater than the data length threshold, then the UE transmits the V2X data message over the air interface using the resource sensing multiple access technique at step 440.

Figure 5:
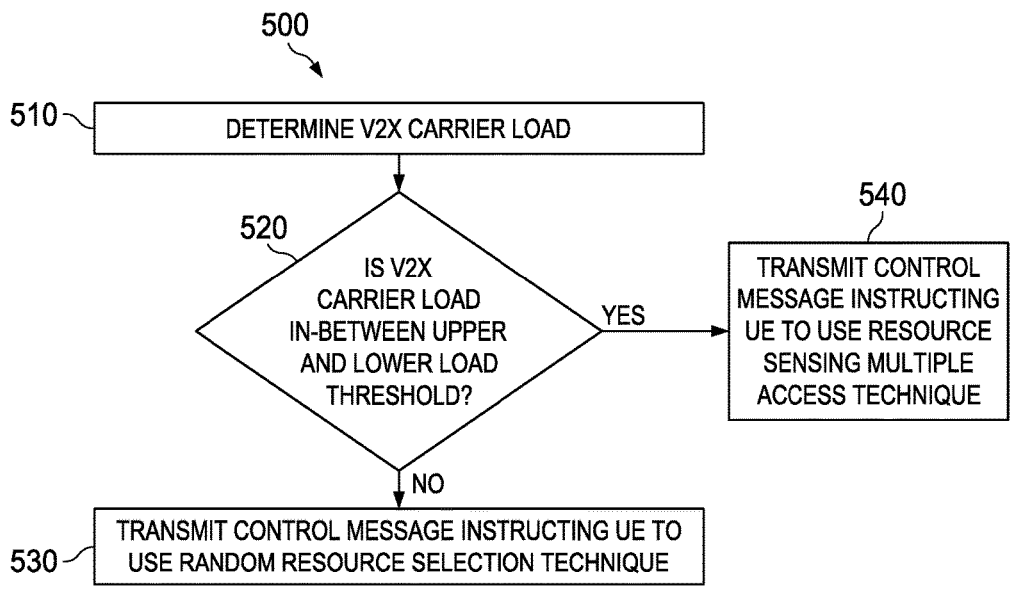
FIG. 5 is a flowchart of an embodiment method for instructing a UE to perform V2X transmissions using either a random resource selection or resource sensing multiple access technique.

FIG. 5 is a flowchart of an embodiment method 500 for instructing a UE to perform V2X transmissions using either a random resource selection or resource sensing multiple access technique, as may be performed by a BS. At step 510, a BS determines a V2X carrier load in a coverage area of the BS. At step 520, the V2X carrier load is compared to an upper and lower load threshold. If the V2X carrier load in the coverage area of the BS is less than the lower load threshold or greater than the upper load threshold, the BS transmits a control message to the UE that instructs the UE to perform a data transmission using the random resource selection technique at step 530. Alternatively, if the V2X carrier load in the coverage area of the BS is in-between the upper and lower load thresholds, the BS transmits a control message to the UE that instructs the UE to perform a data transmission using the resource sensing multiple access technique at step 540. The BS may transmit the control message indirectly to the UE via an intermediate device. The intermediate device may be another UE or another BS. Alternatively, the BS may transmit the control message to the UE without another BS or another UE.

Figure 6:
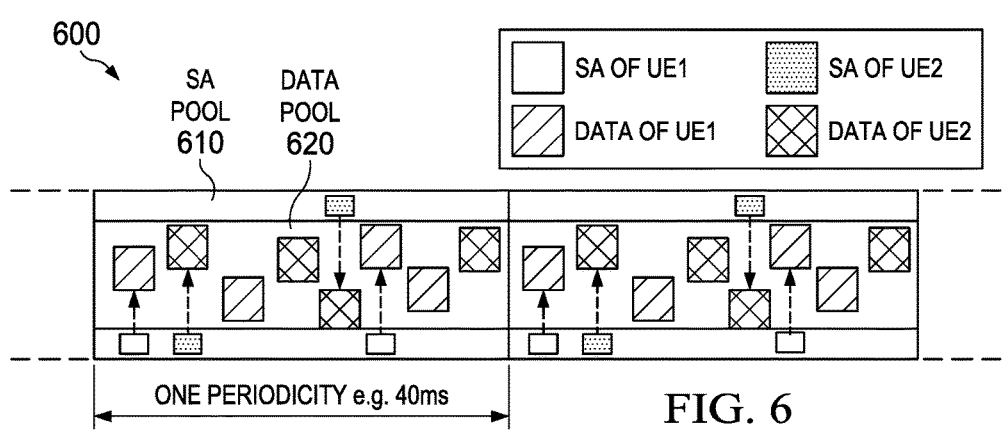
FIG. 6 is a diagram of an embodiment of a resource pool structure.

FIG. 6 is a diagram of an embodiment resource pool structure 600 showing both data pools 620 and scheduling assignment (SA) pools 610. In some embodiments, where the V2V traffic may have a known periodicity and a constant message size, a correlation exists between the number of SAs transmitted and the load around a UE. On each SA pool subframe where a UE does not transmit, it attempts to decode the transmitted downlink control information (DCI). The UE can determine the number of SAs it can decode over a number of subframes of the SA pool to average random fluctuations. The determined average resource occupancy (G) is a crude measurement of the load.

Figure 7:
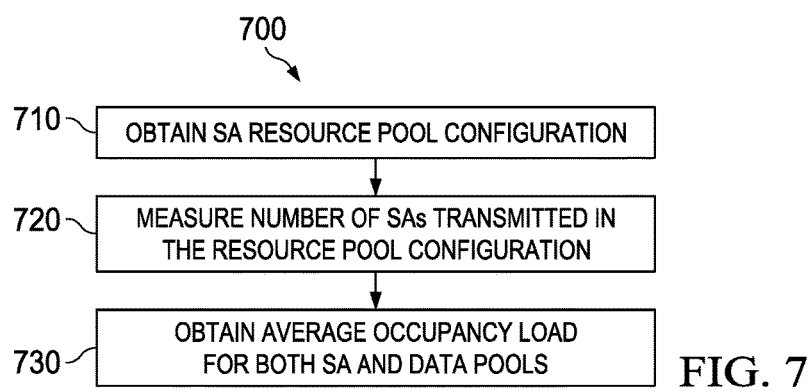
FIG. 7 is a flowchart of an embodiment method for determining the average resource occupancy in a V2X network.

FIG. 7 is a flowchart of an embodiment method 700 for determining the average resource occupancy in a V2X network, as may be performed by a UE. At step 710, the UE obtains the resource pool configuration. The resource pool configuration may be sent, for instance, in a system information block (SIB) message and refer to the carrier from where the SIB is sent (shared carrier) or a dedicated carrier. In an embodiment, if the UE is in coverage, the pools may be obtained from the eNB by either dedicated or common radio resource control (RRC) signaling. In another embodiment, if the V2V signaling mechanism is the same as for device-to-device (D2D), the pools can be obtained from SIB18/19. In a separate embodiment, if the UE is out-of-coverage, the UE may rely on pre-configured pools known to the UE. At step 720, the UE determines the number of SAs it can decode over a number of subframes of the SA pool to average random fluctuations. The UE then determines the average resource occupancy load (G), which is a crude measurement of the load at step 730. Alternatively, the resource occupancy could be measured by other means, such as performing energy measurements on the transmission resources comprising the V2X carrier.

The process of determining the resource occupancy load can be further refined by the following:

Firstly, in an embodiment, the length of the averaging window can be speed dependent. For instance, in stop/go traffic, the averaging window can be different from fluid traffic conditions on a highway.

In an embodiment, where the V2V traffic includes a periodic and a non-periodic component, the average load occupancy may be measured on the SAs for periodic messages only.

In an embodiment, where the average load occupancy indicates the average load on the SA pool, when the message size of a periodic V2V transmission is roughly known, and when the UE knows the size of the data pool for V2V transmission, the UE can use this information to determine the average load on the V2V data pool (for the periodic component; for aperiodic, same caveat as before applies).

In an embodiment, where the SA and/or data message is repeated, the number of repetitions can be taken into account for the determination of the average load occupancy.

In an embodiment, where there is a one-to-one association between SA and data, the UE can measure data occupancy, SA occupancy, or both and not just rely on the SA measurement.

In an embodiment further refinements can be obtained by also including e.g., reference signal received power (RSRP) or reference signal received quality (RSRQ)-like measurements on SAs, or taking into account the value of the power control command in the SA.

Lastly, in an embodiment, a UE can transmit a bitmap to measure how many UEs can listen to this particular UE, where typically the known occupancy factor for the UE is limited to the number of UE's it can listen to. Given that traffic can be highly variable by nature, there are cases where there could be significant differences between the two measures. One way to obtain the number of UE's a UE can listen to, is to have each UE indicate resources it can correctly decode. This can be done by appending a bitmap message to a V2V transmission, wherein each bit of the bitmap represents a particular SA resource. For instance, transmitting a '1' would indicate that the message corresponding to that particular SA was successfully received. Transmitting a '0' would indicate that it was not. This bitmap appendage technique increases the V2V message size, and thus the overhead. This can be compensated by having only a fraction of all the UEs adding this bitmap. Another alternative is to only occasionally add this bitmap at known locations. Another advantage of this bitmap appendage technique is by adjusting the number of retransmissions of a given message to prevent unnecessary collisions. This technique can be further improved, although at the price of higher complexity. Specifically, a given UE can also decode all the data messages, and keep track of them to determine the actual UE map around it. This way, knowing the message periodicity and message size, the UE can know the average occupancy.

Figure 8:
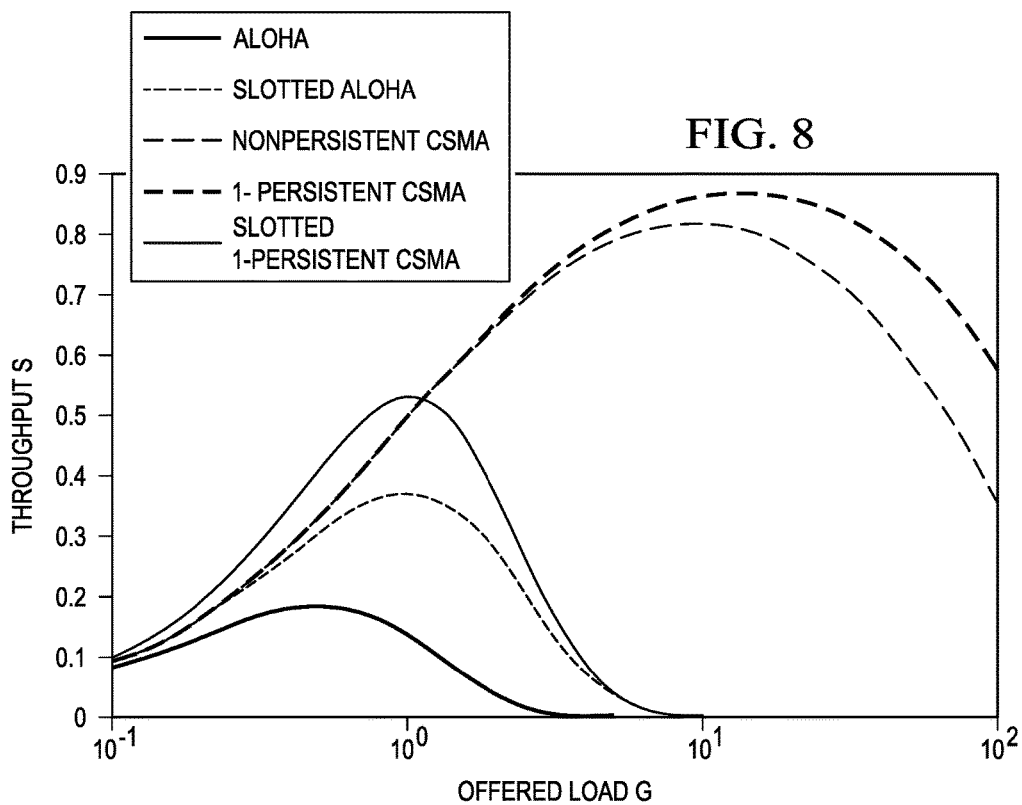
FIG. 8 is a graph of throughput curves for transmissions using various grant-free access protocols.

FIG. 8 is a graph of throughput curves for transmission using various grant-free access protocols (ALOHA, Carrier sense multiple access (CSMA), etc.). The graphs show that the curves are generally dome-shaped. There is a ramping up where the throughput increases with load (low collision regime) and after a peak, the throughput decreases with load, and asymptotically reaches zero (high collision regime).

Figure 9:
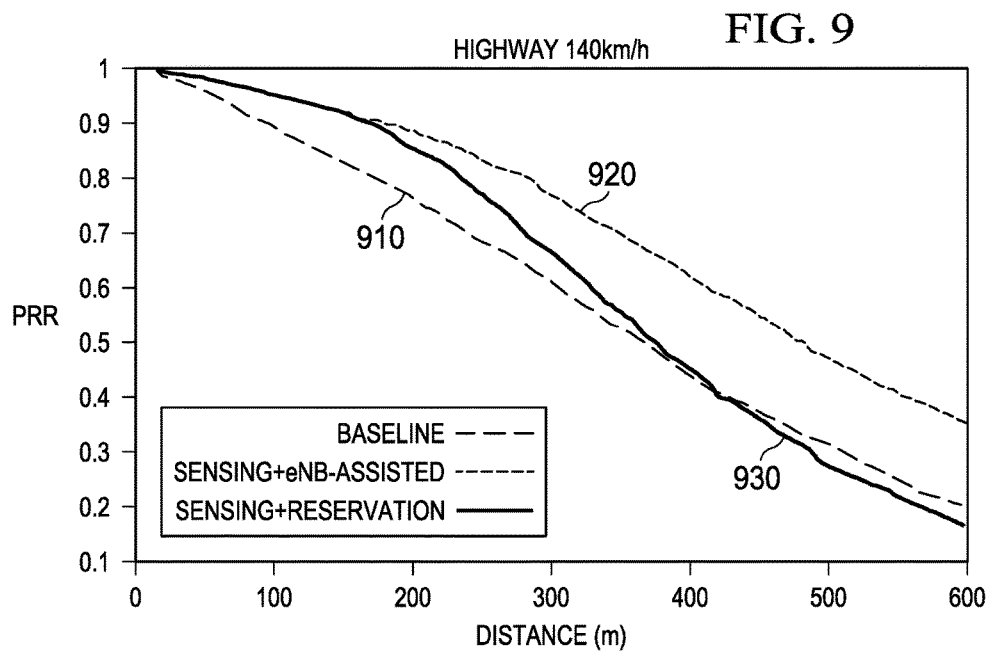
FIG. 9 is a graph of autonomous UE transmissions of LTE-based traffic at 140 km/h speeds.

FIG. 9 is a graph of autonomous UE transmissions of LTE-based V2X traffic at 140 km/h speeds. As shown in the curves, it is observed that sensing 910 is more beneficial (sensing +reservation curve) than other techniques 920. This is a case where the resource utilization is relatively low, and sensing avoids collisions. At lower speeds, throughput is decreasing and similar gains are not observed.

Figure 10:
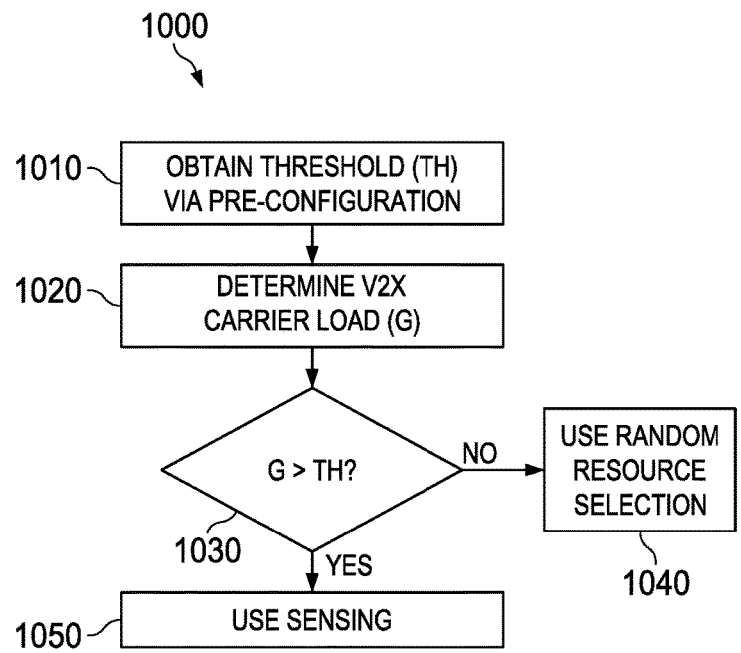
FIG. 10 is a flowchart of yet another embodiment method for transmitting data over a V2X network using either a random resource selection or resource sensing multiple access technique.

FIG. 10 is a flowchart of yet another embodiment method 1000 for transmitting data over a V2X network using either a random resource selection or resource sensing multiple access technique, as may be performed by a fully autonomous UE (no network involvement). The embodiment is limited to a local view of the network environment and does not utilize the resources of a BS. At step 1010, the UE obtains a load threshold (Th) through pre-configuration. The embodiment method requires defined specifications for UE behavior and a minimum standardization effort. At step 1020, the UE determines the V2X carrier load. At step 1030, the UE compares the V2X carrier load with the pre-configured load threshold. Based on this comparison, if the V2X carrier load in the coverage area of a BS is less than the load threshold, then the UE transmits the V2X data message over an air interface using the random resource selection technique at step 1040. Alternatively, if the V2X carrier load in the coverage area of a BS is greater than the load threshold, then the UE transmits the V2X data message over the air interface using the resource sensing multiple access technique at step 1050. For example, the UE may detect an isolated hot spot in a cell (traffic jam) and chose against resource sensing multiple access method.

Figure 11:
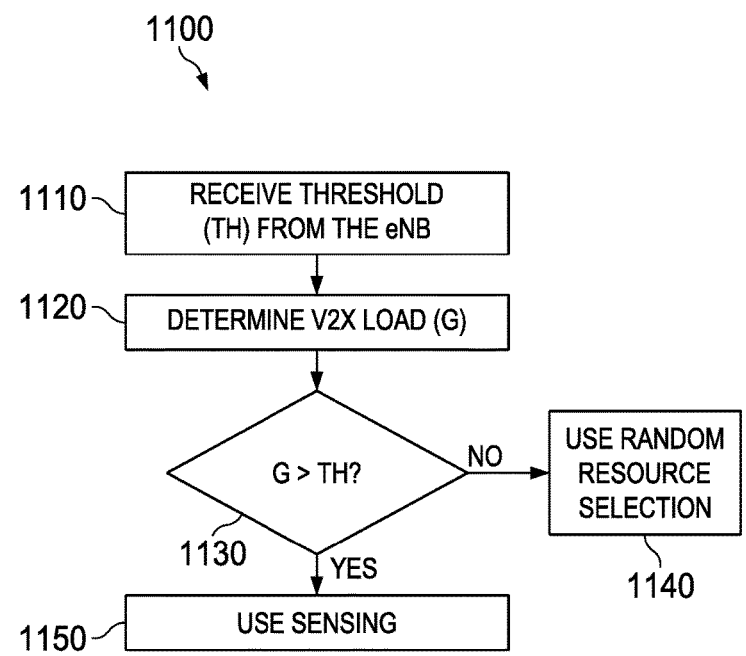
FIG. 11 is a flowchart of yet another embodiment method for transmitting data over a V2X network using either a random resource selection or resource sensing multiple access technique.

FIG. 11 is a flowchart of yet another embodiment method 1100 for transmitting data over a V2X network using either a random resource selection or resource sensing multiple access technique, as may be performed by a UE and an eNB. In this embodiment, the UE follows the same process as an autonomous UE; with the exception that the UE may receive the threshold value from the eNB 1110 instead of having it pre-configured 1010. In this embodiment, the signal messaging used to send the threshold value would typically be via a SIB, but a dedicated RRC message, a physical layer message (e.g., DCI), or the like can also be used. At step 1120, the UE determines the V2X carrier load. At step 1130, the UE compares the V2X carrier load with the load threshold received from the eNB. Based on this comparison, if the V2X carrier load in the coverage area of the eNB is less than the load threshold, then the UE transmits the V2X data message over an air interface using the random resource selection technique at step 1140. Alternatively, if the V2X carrier load in the coverage area of the eNB is greater than the load threshold, then the UE transmits the V2X data message over the air interface using the resource sensing multiple access technique at step 1150.

FIG. 12 is a flowchart of another embodiment method 1200 for instructing a UE to perform V2X transmissions using either a random resource selection or resource sensing multiple access technique, as may be performed by an eNB. At step 1210, the eNB probes the UE to report the V2X carrier load in a coverage area of the eNB. At step 1220, the eNB receives the V2X carrier load from the UE. At step 1230, the eNB determines if the UE should use the random resource selection technique or the resource sensing multiple access technique to transmit V2X data messages. At step 1240, the eNB sends a control message to the UE to inform the UE of the selected technique.

FIG. 13 is a flowchart of an embodiment method 1300 for transmitting data over a V2X network using either a random resource selection or resource sensing multiple access technique, as may be performed by a UE. At step 1310, the UE receives a request from an eNB to send the V2X carrier load to the eNB. The request from the eNB to measure and send back the V2X carrier load could be included in a DCI or sent in a RRC dedicated message. The message may include the average duration window, or other parameters needed to perform the measurement (e.g., CQI threshold to indicate which resource is considered as occupied or not). At step 1320, the UE sends the V2X carrier load to the eNB. The UE may report the V2X carrier load in a RRC message, in a media access control (MAC) message, or in a physical layer message, similar to channel quality indicator (CQI). In this instance, a new physical uplink control channel (PUCCH) format may be needed. At step 1330, the UE receives the appropriate resource selection technique determined by the eNB in the form of a control message. The eNB may inform the UE of the selected technique in a dedicated RRC message, or in a SIB-type message.

FIG. 14 is a block diagram of an embodiment processing system 1400 for performing methods described herein, which may be installed in a host device. As shown, the processing system 1400 includes a processor 1410, a memory 1420, and interfaces 1430, 1440, and 1450, which may (or may not) be arranged as shown in the figure. The processor 1410 may be any component or collection of components adapted to perform computations and/or other processing related tasks. The memory 1420 may be any component or collection of components adapted to store programming and/or instructions for execution by the processor 1410. In an embodiment, the memory 1420 includes a non-transitory computer readable medium. The interfaces 1430, 1440, and 1450 may be any component or collection of components that allow the processing system 1400 to communicate with other devices/components and/or a user. For example, one or more of the interfaces 1430, 1440, and 1450 may be adapted to communicate data, control, or management messages from the processor 1410 to applications installed on the host device and/or a remote device.

In another embodiment, one or more of the interfaces 1430, 1440, and 1450 may be adapted to allow a user or user device (e.g., personal computer (PC), etc.) to interact/communicate with the processing system 1400. The processing system 1400 may include additional components not depicted in the figure, such as long term storage (e.g., non-volatile memory, etc.).

In another embodiment, the selection process is based on UE speed alone or in combination with the methods described in the above embodiments. The rationale is that if the UE is moving at a relatively fast speed, what is sensed at a given time will be quickly obsolete and sensing can be a poor choice. Thus, at high speed a UE might be better off performing a different method. In an embodiment, the UE computes an indication of its speed. Once the indication of the speed is obtained, it is compared to a speed threshold that can be pre-configured or obtained from the network. The resource selection technique is then selected based on the speed and its relation to the speed threshold.

In the embodiment above, the speed can be the instantaneous speed averaged over a time window, the maximum instantaneous UE speed over a time window, and the like. The instantaneous speed may be obtained from a satellite system (e.g., Global Navigation Satellite System (GNSS)), measurements on pilot signals, and the like. The indication of the speed can be based on absolute speed or relative speed measurement.

In some embodiments, the processing system 1400 is included in a network device that is accessing, or otherwise part of, a telecommunications network. In one example, the processing system 1400 is in a network-side device in a wireless telecommunications network, such as a BS, a relay station, a scheduler, a controller, a gateway, a router, an applications server, or any other device in the telecommunications network. In other embodiments, the processing system 1400 is in a user-side device accessing a wireless telecommunications network, such as a mobile station, a user equipment (UE), a personal computer (PC), a tablet, a wearable communications device (e.g., a smartwatch, etc.), or any other device adapted to access a telecommunications network. In some embodiments, one or more of the interfaces 1430, 1440, and 1450 connect the processing system 1400 to a transceiver adapted to transmit and receive signaling over the telecommunications network.

FIG. 15 is a block diagram of a transceiver 1500 adapted to transmit and receive signaling over a telecommunications network. The transceiver 1500 may be installed in a host device. As shown, the transceiver 1500 comprises a network-side interface 1510, a coupler 1520, a transmitter 1530, a receiver 1540, a signal processor 1550, and a device-side interface 1560. The network-side interface 1510 may include any component or collection of components adapted to transmit or receive signaling over a wireless telecommunications network. The coupler 1520 may include any component or collection of components adapted to facilitate bi-directional communication over the network-side interface 1510. The transmitter 1530 may include any component or collection of components (e.g., up-converter, power amplifier, etc.) adapted to convert a baseband signal into a modulated carrier signal suitable for transmission over the network-side interface 1510. The receiver 1540 may include any component or collection of components (e.g., down-converter, low noise amplifier, etc.) adapted to convert a carrier signal received over the network-side interface 1510 into a baseband signal. The signal processor 1210 may include any component or collection of components adapted to convert a baseband signal into a data signal suitable for communication over the device-side interface(s) 1560, or vice-versa. The device-side interface(s) 1560 may include any component or collection of components adapted to communicate data-signals between the signal processor 1550 and components within the host device (e.g., the processing system 1400, local area network (LAN) ports, etc.).

The transceiver 1500 may transmit and receive signaling over any type of communications medium. In some embodiments, the transceiver 1500 transmits and receives signaling over a wireless medium. For example, the transceiver 1500 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1510 comprises one or more antenna/radiating elements. For example, the network-side interface 1510 may include a single antenna, multiple separate antennas, or a multi-antenna array configured for multi-layer communication, e.g., single input multiple output (SIMO), multiple input single output (MISO), multiple input multiple output (MIMO), etc. Specific processing systems and/or transceivers may utilize all of the components shown, or only a subset of the components; and levels of integration may vary from device to device.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for vehicle-to-everything (V2X) communication in a wireless network, the method comprising:
   transmitting, by a first user equipment (UE) over a sidelink connection extending between the first UE and a second UE, a data message using a random resource selection technique in response to determining that a V2X carrier load in a coverage area of a base station (BS) is greater than a first threshold,
   the determining in accordance with an energy level of one or more sub-carriers associated with the BS.

2. The method of claim 1, wherein the data message is transmitted over a grant-free resource that is autonomously selected by the first UE.

3. The method of claim 1, further comprising transmitting, by the first UE, the data message over the sidelink connection using a resource sensing multiple access technique in response to determining that the V2X carrier load in the coverage area of the BS is in-between the first threshold and a second threshold.

4. The method of claim 3, wherein the first UE senses a grant-free resource for a sensing period prior to transmitting the data message over the grant-free resource and prior to an expiration of the sensing period in response to transmitting, by the first UE, the data message using the resource sensing multiple access technique.

5. The method of claim 3, further comprising:
receiving, by the first UE, a control message from the base station instructing the first UE to transmit the data message using the resource sensing multiple access technique in response to determining that the V2X carrier load in the coverage area of the BS is in-between the first threshold and the second threshold.

6. The method of claim 3, wherein the first threshold and the second threshold are pre-configured at the first UE.

7. The method of claim 1, further comprising:
receiving, by the first UE, the first threshold from the BS.

8. The method of claim 1, further comprising:
monitoring a control channel to determine a number of grant-free transmissions performed by neighboring UEs; and
determining the V2X carrier load according to the number of grant-free transmissions performed by the neighboring UEs.

9. The method of claim 1, further comprising transmitting, by the first UE, a second data message over an air interface using the random resource selection technique in response to determining that the V2X carrier load in the coverage area of the base station is less than a second threshold, where the second threshold is less than the first threshold.

10. The method of claim 1, further comprising receiving, by the first UE, a message comprising the first threshold and a second threshold from the base station, the message being a system information block (SIB) message, a dedicated radio resource control (RRC) message, or a physical layer message.

11. The method of claim 1, further comprising:
receiving, by the first UE, a control message from the base station instructing the first UE to transmit the data message using the random resource selection technique in response to determining that the V2X carrier load is greater than the first threshold.

12. A method for vehicle-to-everything (V2X) communication in a wireless network, the method comprising:
transmitting, by a base station (BS) over a wireless connection extending between the base station and a user equipment (UE), a control message to the UE comprising instructions:
monitor a control channel to determine a number of grant-free transmissions performs by neighboring UEs;
determine a V2X carrier load in accordance with a number of grant-free transmissions; and
perform transmissions using a resource sensing multiple access technique in response to determining that the V2X carrier load in a coverage area of the BS is in-between a first threshold and a second threshold.

13. The method of claim 12, further comprising transmitting a second control message to the UE to perform transmissions using a random resource selection technique in response to determining that the V2X carrier load of the coverage area is less than the first threshold or greater than the second threshold.

14. The method of claim 12, wherein the control message is transmitted directly from the BS to the UE.

15. The method of claim 12, wherein the control message is transmitted indirectly from the BS to the UE via an intermediate device.

16. The method of claim 15, wherein the intermediate device is a second BS.

17. The method of claim 15, wherein the intermediate device is a second UE.

18. The method of claim 12, wherein the first threshold and the second threshold are pre-configured at the UE.

19. A user equipment (UE) comprising:
a non-transitory memory storage comprising instructions; and
one or more processors in communication with the non-transitory memory storage, wherein the one or more processors execute the instructions to:
autonomously select a grant-free resource for a sensing period; and transmit a data message in the grant-free resource over an air interface using a resource sensing multiple access technique in response to determining that a vehicle-to-everything (V2X) carrier load in a coverage area of a base station is in-between a first threshold and a second threshold, the data message transmitted prior to an expiration of the sensing period.

20. The UE of claim 19, wherein the UE is a first UE, and wherein the air interface is a sidelink connection extending between the first UE and a second UE.

21. The UE of claim 19, wherein the air interface is a sidelink connection extending between the UE and a base station.

22. The UE of claim 19, wherein the one or more processors execute instructions to select the grant-free resource autonomously.

23. The UE of claim 19, wherein the one or more processors execute instructions to transmit a second data message using a random resource selection technique in response to determining that a V2X carrier load in a coverage area of a base station is less than a first threshold or greater than a second threshold.

24. The UE of claim 23, wherein the one or more processors execute instructions to transmit a third data message using a resource sensing multiple access technique in response to determining that the V2X carrier load in the coverage area of the base station is in-between the first threshold and the second threshold.

25. The UE of claim 24, wherein the one or more processors execute instructions to receive the first threshold or the second threshold from the base station.

26. The UE of claim 23, wherein the one or more processors execute instructions to identify the V2X carrier load in accordance with an energy level of one or more sub-carriers associated with the base station.

27. The UE of claim 19, wherein the one or more processors execute instructions to:
monitor a control channel to determine a number of grant-free transmissions performed by neighboring UEs; and
identify a V2X carrier load according to the number of grant-free transmissions performed by the neighboring UEs.

* * * * *